United States Patent
Ojima et al.

(10) Patent No.: US 12,381,284 B2
(45) Date of Patent: Aug. 5, 2025

(54) BATTERY MODULE

(71) Applicant: Vehicle Energy Japan Inc., Hitachinaka (JP)

(72) Inventors: Kazunori Ojima, Hitachinaka (JP); Sadayuki Aoki, Hitachinaka (JP); Osamu Kubota, Hitachinaka (JP); Yoshitaka Watahiki, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 629 days.

(21) Appl. No.: 17/635,943

(22) PCT Filed: Aug. 28, 2020

(86) PCT No.: PCT/JP2020/032510
§ 371 (c)(1),
(2) Date: Feb. 16, 2022

(87) PCT Pub. No.: WO2021/044952
PCT Pub. Date: Mar. 11, 2021

(65) Prior Publication Data
US 2022/0294073 A1     Sep. 15, 2022

(30) Foreign Application Priority Data
Sep. 4, 2019   (JP) ................................. 2019-161427

(51) Int. Cl.
H01M 50/298     (2021.01)
(52) U.S. Cl.
CPC ................. H01M 50/298 (2021.01)

(58) Field of Classification Search
CPC ............. H01M 50/298; H01M 10/482; H01M 50/249; H01M 50/569; H01M 50/209; H01M 2220/20; Y02E 60/10
See application file for complete search history.

(56) References Cited

U.S. PATENT DOCUMENTS

| 2018/0269440 A1 | 9/2018 | Lee et al. |
| 2019/0245185 A1 | 8/2019 | Ishihara |

FOREIGN PATENT DOCUMENTS

| JP | 11-162425 A | 6/1999 |
| JP | 2000-156549 A | 6/2000 |

(Continued)

OTHER PUBLICATIONS

English translation of JP-2019012614-A (Year: 2019).*
(Continued)

*Primary Examiner* — Ula C Ruddock
*Assistant Examiner* — Sarika Gupta
(74) *Attorney, Agent, or Firm* — Crowell & Moring LLP

(57) ABSTRACT

Provided is a battery module capable of suppressing failures in accurate detection of the state of battery cells due to the effects of unwanted radiation from the battery cells. A battery module 30 includes a plurality of battery cells 20 that are stacked and disposed and a wiring member 50 to detect the state of the plurality of battery cells 20. In the wiring member 50, an insulating base material 52, a wiring layer 53 disposed on one surface 52a side of the base material 52 and including a plurality of detection lines 53a to detect the state of the plurality of battery cells 20, and a ground layer 55 disposed in a position corresponding to at least the wiring layer 53, on the other surface 52b side of the base material 52 are stacked.

3 Claims, 7 Drawing Sheets

(56) References Cited

FOREIGN PATENT DOCUMENTS

| | | |
|---|---|---|
| JP | 2013-4185 A | 1/2013 |
| JP | 2013-105571 A | 5/2013 |
| JP | 2015-106536 A | 6/2015 |
| JP | 2018-18612 A | 2/2018 |
| JP | 2018-530886 A | 10/2018 |
| JP | 2019012614 A * | 1/2019 |

OTHER PUBLICATIONS

Chinese-language Office Action issued in Chinese Application No. 202080059777.9 dated Jun. 15, 2023 (8 pages).
International Search Report (PCT/ISA/210) issued in PCT Application No. PCT/JP2020/032510 dated Nov. 2, 2020 with English translation (four (4) pages).
Japanese-language Written Opinion (PCT/ISA/237) issued in PCT Application No. PCT/JP2020/032510 dated Nov. 2, 2020 (four (4) pages).
Japanese-language International Preliminary Report on Patentability (PCT/IPEA/409) issued in PCT Application No. PCT/JP2020/032510 dated Jun. 3, 2021, including Annexes with partial English translation (nine (9) pages).
Chinese-language Office Action issued in Chinese Application No. 202080059777.9 dated Dec. 21, 2023 (5 pages).
Extended European Search Report issued in European Apptication No. 20861036.0 dated Jul. 15, 2024 (9 pages).

\* cited by examiner

BATTERY MODULE

TECHNICAL FIELD

The present invention relates a battery module including a plurality of battery cells.

BACKGROUND ART

Auto manufactures have conventionally been developing electric vehicles (EV) and hybrid vehicles (HEV) driven by partially being assisted by an electric motor, and as the power source, secondary batteries with a high-capacity and a high-power output have been sought. As such secondary batteries, a battery module including a plurality of battery cells that are stacked and disposed has been known. A wiring member to detect the voltage of each battery cell of the battery module is disclosed in, for example, JP 2013-105571 A.

The aforementioned JP 2013-105571 A discloses a battery wiring module that is attached to a cell group of a plurality of cells arranged, each cell having electrode terminals of a positive electrode and a negative electrode, and that includes a plurality of connection members connected to the electrode terminals and a resin protector made of an insulating resin having a retaining portion to retain the connection members. This battery wiring module is provided with FPCs (Flexible printed circuits) in which a conductive path for voltage detection to detect the voltage of each cell connected to a bus bar is formed.

CITATION LIST

Patent Literature

Patent Literature 1: JP 2013-105571 A

SUMMARY OF INVENTION

Technical Problem

However, as shown in JP 2013-105571 A, for example, when the state of battery cells, such as the voltage of the battery cells, is detected, there is a problem in that accurate detection of the state of the battery cells cannot be performed due to the effects of unwanted radiation from the battery cells.

The present invention has been made in view of such matters and has an object of providing a battery module that can suppress failures in accurate detection of the state of battery cells due to the effects of unwanted radiation from the battery cells.

Solution to Problem

To solve the aforementioned problem, a battery module according to the present invention includes: a plurality of battery cells that are stacked and disposed; and a wiring member disposed on a terminal side of the plurality of battery cells and adapted to detect a state of the plurality of battery cells, in which the wiring member, an insulative insulating layer, a wiring layer disposed on one surface side of the insulating layer and including a plurality of detection lines to detect the state of the plurality of battery cells, and a ground layer disposed in a position corresponding to at least the wiring layer, on another surface side of the insulating layer and having a ground potential are stacked.

Advantageous Effects of Invention

According to the present invention, a battery module capable of suppressing failures in accurate detection of the state of battery cells due to the effects of unwanted radiation from the battery cells can be provided.

DESCRIPTION OF EMBODIMENTS

The battery module according to the embodiments of the present invention will be described below.

First Embodiment

Figure 1:
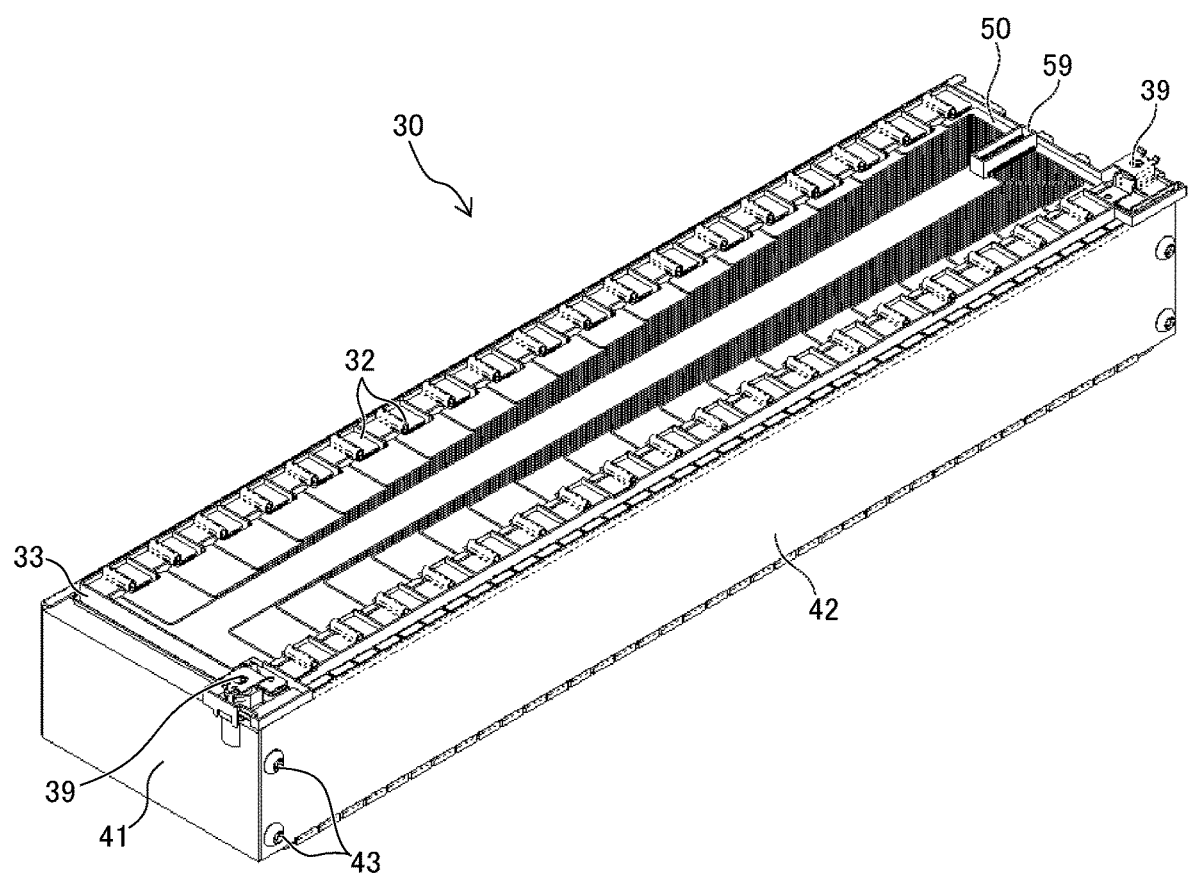
FIG. 1 is a perspective view of a battery module according to a first embodiment of the present invention.
Figure 2:
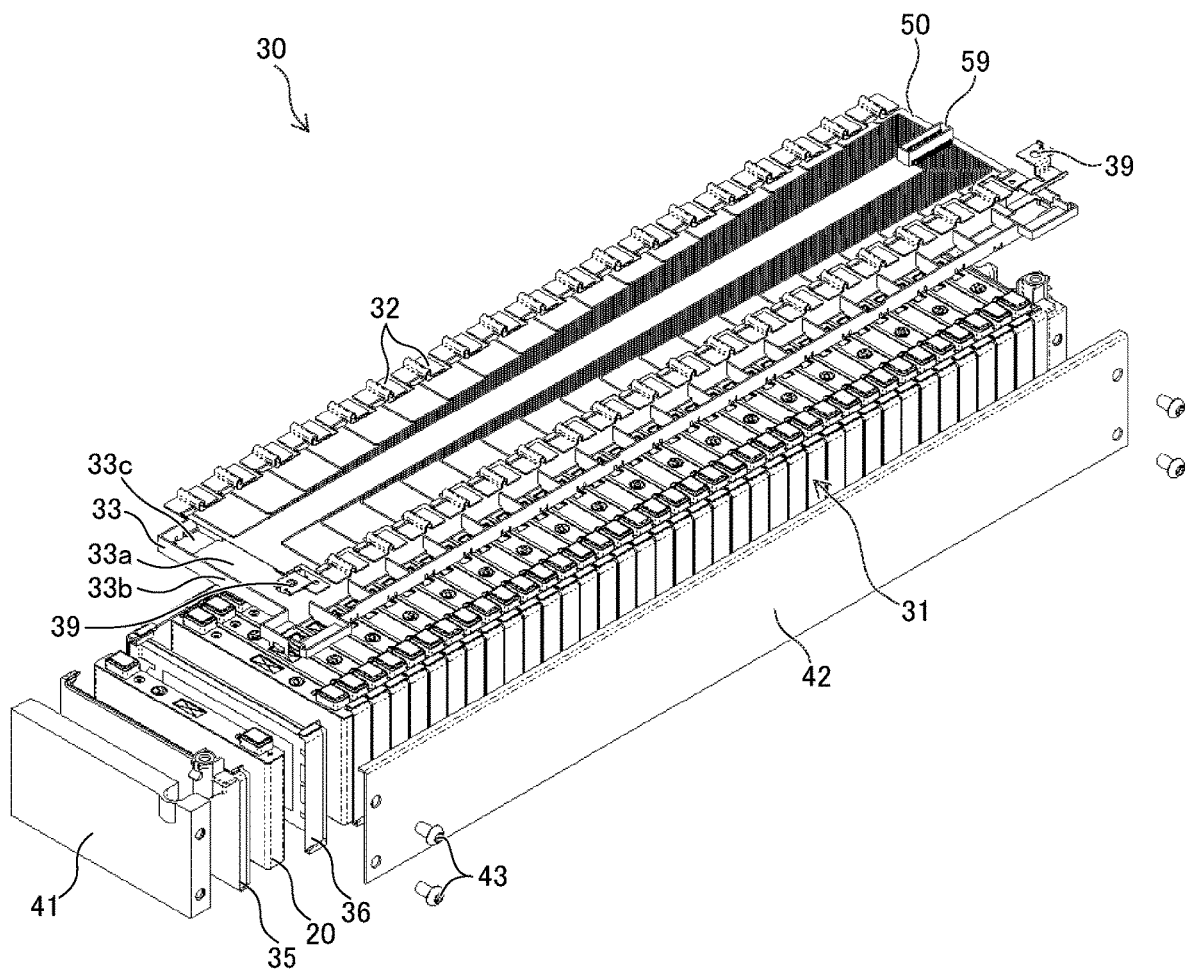
FIG. 2 is an exploded perspective view of the battery module according to the first embodiment of the present invention.

FIG. 1 is a perspective view of a battery module 30 according to a first embodiment of the present invention. FIG. 2 is an exploded perspective view of the battery module 30 according to the first embodiment of the present invention.

The battery module 30 of the first embodiment of the present invention is mounted on a vehicle, for example, an electric vehicle (EV) and a hybrid vehicle (HEV). The battery module 30 stores, in battery cells 20, power supplied via a pair of input/output terminals (not shown) and supplies the power stored in the battery cells 20 to electrical equipment such as a motor of the vehicle via the input/output terminals (not shown).

The battery module 30 includes, as shown in FIG. 1 and FIG. 2, a battery cell stack 31, a plurality of bus bars 32, a bus bar holder 33, a wiring member 50, a pair of end holders 35, a plurality of intermediate holders 36, a pair of end plates 41, and a pair of side plates 42.

Figure 3:
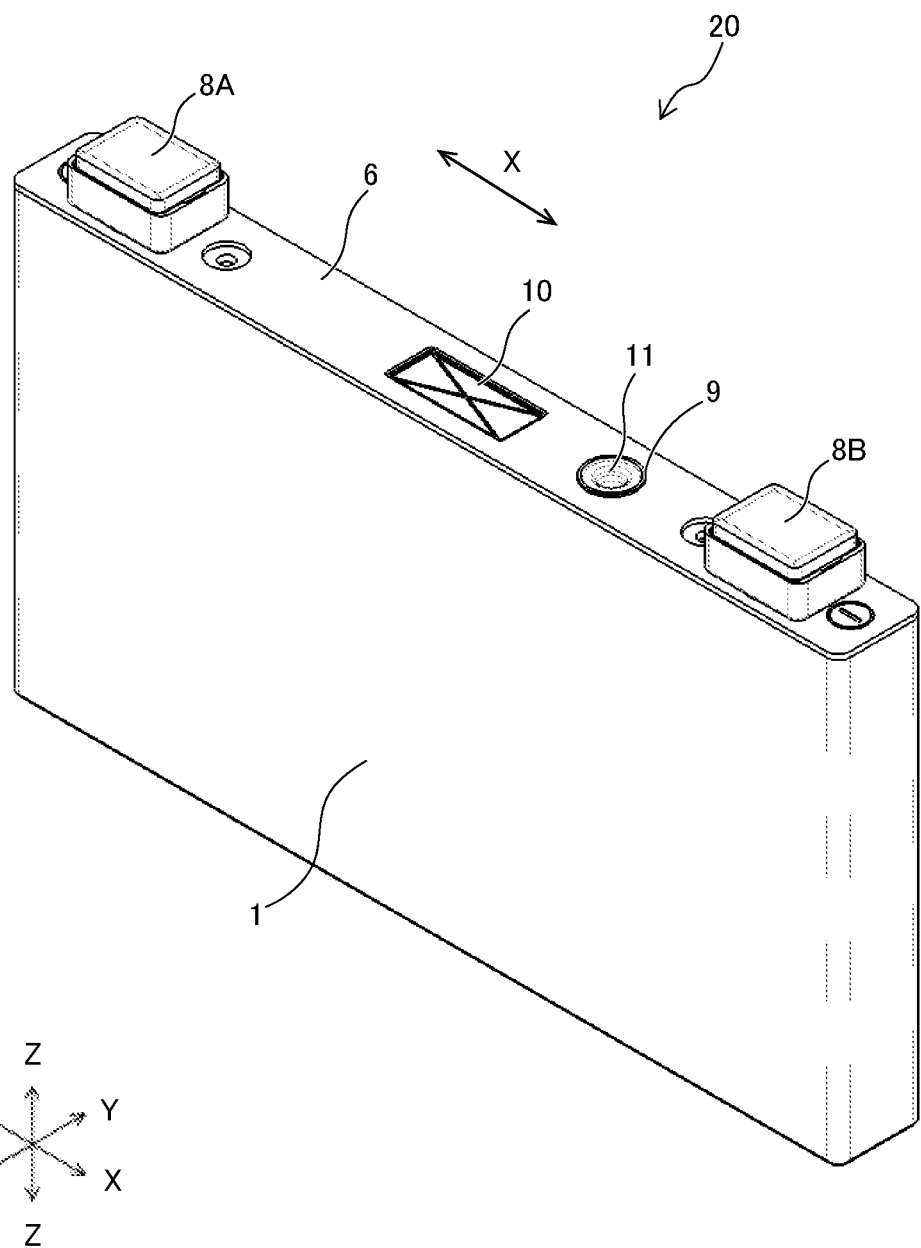
FIG. 3 a perspective view showing the structure of a battery cell of the battery module according to the first embodiment of the present invention.

Herein, FIG. 1 to FIG. 3 show an X direction, a Y direction, and a Z direction that are orthogonal to each other. The X direction is a direction connecting terminals 8A and 8B of the battery cell 20 and this direction is defined as the longitudinal direction of the battery cell 20. The Y direction is a stacking direction in which a plurality of battery cells 20 is stacked. The Z direction is a direction orthogonal to the X direction and the Y direction and is the height direction of the battery module 30 (or the battery cells 20). Further, in the correlation between the wiring member 50 and the battery cell stack 31, the wiring member 50 side is the upper side and the battery cell stack 31 side is the lower side.

The battery cell stack 31 is configured such that a plurality of battery cells 20, which are secondary cells, are stacked. The plurality of bus bars 32 electrically connect a plurality of adjacent battery cells 20 with each other. The bus bar holder 33 holds the plurality of bus bars 32. The wiring member 50 is provided to detect the state of the battery cells 20 (herein, the voltage) and is housed inside the bus bar holder 33. The detailed structure of the wiring member 50 will be described later. The pair of end holders 35 are made of an insulating resin and are disposed at one end and the other end of the battery cell stack 31 in the stacking direction (Y direction). The intermediate holders 36 are made of an insulating resin and are formed so as to partition the adjacently disposed battery cells 20 and cover the opposite end faces of the battery cells 20 in the longitudinal direction (X direction). The pair of end plates 41 are disposed at one end and the other end of the battery cell stack 31 in the stacking direction (Y direction) via the end holders 35. The pair of side plates 42 are disposed at one end and the other end of the battery cell stack 31 in the lateral direction (X direction).

The battery module 30 will be described in detail below.

Each of the battery cells 20 forming the battery cell stack 31 includes a cell case 1 and a lid 6 as shown in FIG. 3. The cell case 1 houses inside an electrode group (not shown) as a power generation body, with an upper opening of the cell case 1 sealed with the lid 6. The lid 6 is welded to the cell case 1 by laser welding. The cell case 1 and the lid 6 form a cell container.

The opposite end portions of the lid 6 in the longitudinal direction (X direction) are provided with a positive electrode external terminal (terminal) 8A and a negative electrode external terminal (terminal) 8B. The positive electrode external terminal 8A and the negative electrode external terminal 8B are shaped in a substantially cuboid projecting upward from the upper surface of the lid 6. The electrode group (not shown) is charged via the positive electrode external terminal 8A and the negative electrode external terminal 8B and the power is supplied to an external load. Further, the center portion of the lid 6 in the longitudinal direction (X direction) is integrally provided with a gas release valve 10. The gas release valve 10 is formed such that the lid 6 is partially thinned to form a slit groove. When the pressure inside the battery cell 20 increases to exceed a predetermined pressure, the gas release valve 10 cleaves to release the gas inside the battery cell 20. Furthermore, a plug 11 is welded to the lid 6 and seals a filling port 9 for filling the inside of the cell case 1 with an electrolyte solution.

The battery cell stack 31 (see FIG. 2) is configured such that the plurality of battery cells 20 is alternately inverted to be stacked and disposed, with the positive electrode external terminal 8A of one battery cell 20 of the adjacent two battery cells 20 being adjacent to the negative electrode external terminal 8B of the other battery cell 20 in the stacking direction.

As shown in FIG. 2, the bus bar 32 is a conductive metal plate-like member. The bus bar 32 electrically connects the positive electrode external terminal 8A and the negative electrode external terminal 8B of the adjacently disposed battery cells 20. In this manner, the plurality of battery cells 20 is connected in series. The method for connecting the positive electrode external terminal 8A and the negative electrode external terminal 8B by the bus bar 32 is not particularly limited, and the connection may be performed by, for example, laser welding, ultrasonic welding, or soldering.

The bus bar holder 33 is disposed so as to cover the lids 6 of the plurality of battery cells 20. The bus bar holder 33 is a member made of, for example, an insulating resin such as PP (polypropylene). The bus bar holder 33 includes a bottom face portion 33a that is disposed so as to face the lids 6 of the battery cells 20 and to which the plurality of bus bars 32 is attached, and a plurality of side walls 33b provided upward from the periphery of the bottom face portion 33a. In portions of the bottom face portion 33a that are positioned below the bus bars 32, openings 33c through which the positive electrode external terminal 8A and the negative electrode external terminal 8B of each battery cell 20 are inserted are formed. Further, on one side in the X direction in the opposite end portions in the Y direction of the bus bar holder 33, terminal strips 39 electrically connected to the bus bars 32 disposed at one end and the other end in the Y direction of the plurality of bus bars 32 are provided. The terminal strips 39 are electrically connected to the aforementioned input/output terminals (not shown). The input/output terminals (not shown) are connected to electrical equipment such as the motor of the vehicle.

The end plate 41 is a metal plate-like member. The end plates 41 are disposed so as to sandwich the battery cell stack 31 from the opposite sides in the stacking direction via the end holders 35. On the opposite end faces of each end plate 41 in the X direction, holes to fix the side plates 42 are formed.

The side plate 42 is a metal plate-like member. The side plates 42 extend from one end to the other end of the battery cell stack 31 in the longitudinal direction (Y direction) and are disposed so as to sandwich the battery cell stack 31 from the opposite sides in the lateral direction (X direction) via the side surface portions of the intermediate holders 36 in the X direction. In the opposite end portions of each side plate 42 in the Y direction, insertion holes are formed and the side plates 42 are fixed to the end plates 41 using fixing members 43 such as screws and rivets.

Next, the detailed structure of the wiring member 50 will be described.

The wiring member 50 is disposed on the bottom face portion 33a of the bus bar holder 33 and extends from one end to the other end of the battery cell stack 31 in the stacking direction. In the present embodiment, the wiring member 50 includes a wiring board 51 and a connector 59 attached to one end portion of the wiring board 51 in the longitudinal direction (Y direction).

Figure 4:
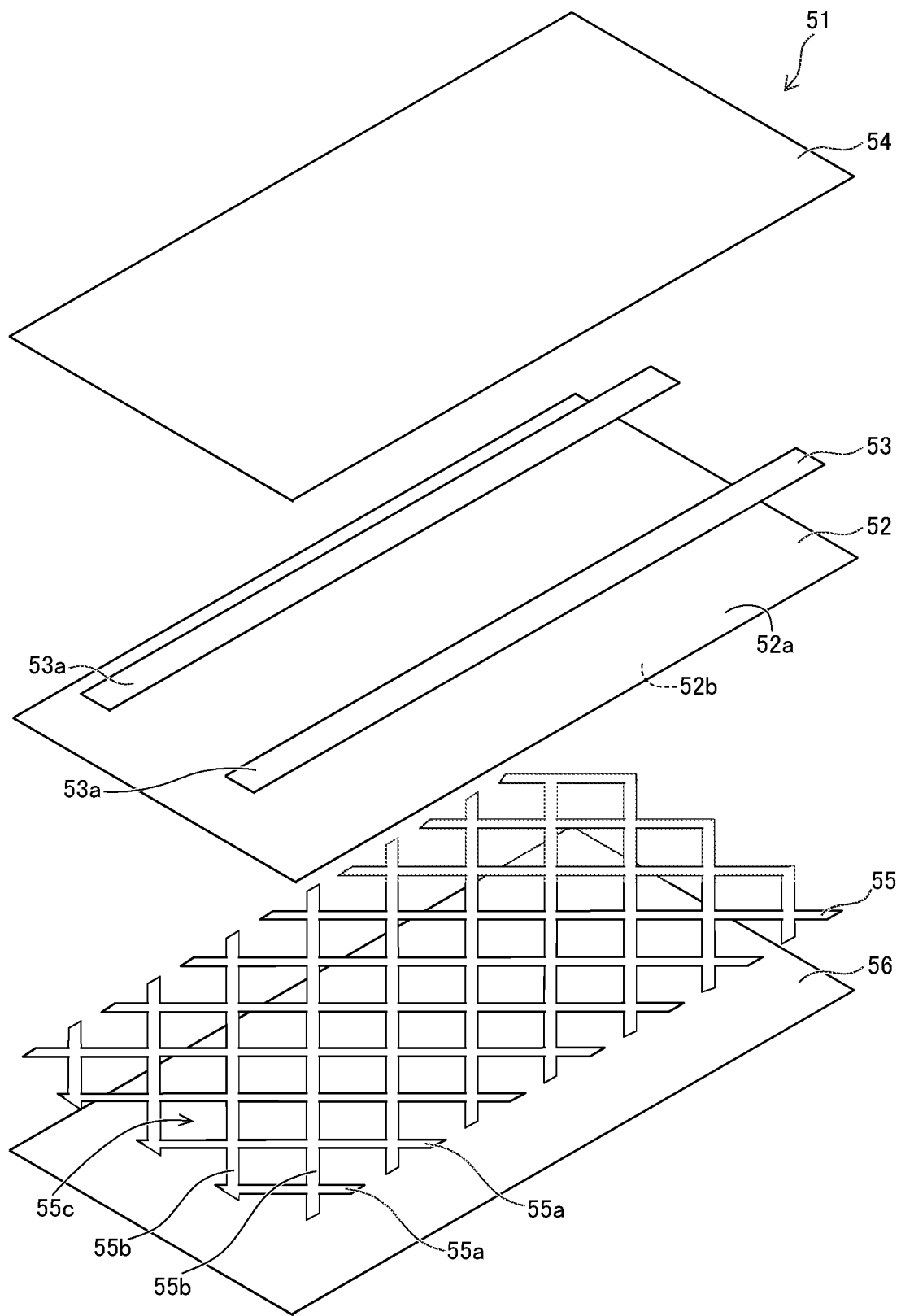
FIG. 4 is an exploded perspective view showing the peripheral structure of a wiring layer and a ground layer of the battery module according to the first embodiment of the present invention.

The wiring board 51 includes, as shown in FIG. 4, an insulating base material 52, a wiring layer 53 disposed on the side of one surface 52a (upper side) of the base material 52, an insulating first cover layer 54 disposed so as to cover predetermined regions of the wiring layer 53 and the base material 52, a ground layer 55 disposed in a position corresponding to at least the wiring layer 53, on the side of the other surface 52b (lower side) of the base material 52, and an insulating second cover layer 56 disposed so as to cover predetermined regions of the ground layer 55 and the base material 52.

The wiring board 51 is not particularly limited, and may be a so-called flexible board having flexibility or a non-flexible board, but preferably, a flexible board from the viewpoint of the thinness, lightness, and bendability.

The material of the base material 52 is not particularly limited, and a polyimide resin, a polyethylene terephthalate resin, a glass epoxy resin, or the like may be used. However, a polyimide resin is preferably used from the viewpoint of the flexibility, heat resistance, or the like.

The material of the wiring layer 53 is not particularly limited as long as it has conductivity, and for example, copper foil is used. The method for forming the wiring layer 53 is not particularly limited, and for example, the wiring layer 53 is formed by etching copper foil (conductive layer) provided on one surface 52a of the base material 52 into a predetermined shape.

The first cover layer 54 is not particularly limited, and is formed of, for example, a cover film including a polyimide layer and an adhesive layer, a solder resist, or the like.

The material of the ground layer 55 is not particularly limited as long as it has conductivity, and for example, copper foil is used. The method for forming the ground layer 55 is not particularly limited, and for example, the ground layer 55 is formed by etching copper foil (conductive layer) provided on the other surface 52b of the base material 52 into a predetermined shape.

The second cover layer 56 is not particularly limited, and is formed of, for example, a cover film including a polyimide layer and an adhesive layer, a solder resist, or the like.

Herein, the wiring layer 53 includes a plurality of detection lines 53a to detect the state of the plurality of battery cells 20. As the state of the battery cells 20, for example, the voltage and the temperature of the battery cells 20, the current flowing through the battery cells 20, and the like can be enumerated. Herein, the detection of the voltage of the battery cells 20 will be described. The thickness and the wiring width of the detection line 53a are not particularly limited, and the detection line 53a is formed such that the thickness is several micrometers to several tens of micrometers and the wiring width is several tens of micrometers to several hundreds of micrometers. When the cross section of the detection line 53a is small as in this case, the effects of unwanted radiation, which will be described later, increase. It should be noted that in the present embodiment, all the detection lines 53a are formed so as to have the same thickness and the same wiring width.

One end of each detection line 53a is electrically connected to any of the bus bars 32, and the other end is electrically connected to the connector 59. A wire harness (not shown) is connected to the connector 59, and the connector 59 is connected to a battery control device (not shown) via the wire harness (not shown). The battery control device detects the voltage of the battery cell 20 corresponding to each detection line 53a and transmits the detection results to a vehicle control device (not shown).

The method for electrically connecting one end of the detection line 53a to the bus bar 32 is not particularly limited, and the connection may be performed by, for example, soldering, pressure welding, laser welding, or ultrasonic welding. Further, the detection line 53a may be directly connected to the bus bar 32, or a laminated plate including nickel, copper, or the like is provided in the wiring board 51 so that the detection line 53a and the bus bar 32 may be electrically connected via the plate. It should be noted that the plurality of bus bars 32 is arranged along the longitudinal direction (Y direction) of the wiring board 51, and since the distances between the bus bars 32 and the connector 59 differ, the wiring lengths of the plurality of detection lines 53a differ.

Herein, when the battery module 30 charges and discharges, a large amount of electric charge moves within the battery cells 20, and thus, the potential of the battery cells 20 fluctuates, thereby generating unwanted radiation from the battery cells 20. The wiring board 51 is disposed closely adjacent to the battery cells 20, and is thus susceptible to the unwanted radiation, and the unwanted radiation turn into noise to fluctuate the potential of the detection lines 53a. Therefore, the accuracy in detecting the voltage of each battery cell 20 could be deteriorated.

Thus, in the present embodiment, the other surface 52b of the base material 52 of the wiring board 51 is provided with the ground layer 55 having a ground potential. The ground layer 55 is provided on substantially the entire surface of the other surface 52b of the base material 52. The ground layer 55 is electrically connected to, for example, the side plates 42, the end plates 41, or the ground terminal of the connector 59, so as to have a ground potential.

The ground layer 55 is provided on the other surface 52b of the base material 52 of the wiring board 51, so that the electromagnetic waves emitted from the battery cells 20 are shielded by the ground layer 55, thereby suppressing the fluctuation of the potential of the detection lines 53a due to unwanted radiation. Thus, the deterioration of accuracy in detecting the voltage of each battery cell 20 can be suppressed.

The shape of the ground layer 55 is not particularly limited, and may be, for example, a solid shape and a shape in which a plurality of through holes is formed on a conductive layer (copper foil). The shape in which a plurality of through holes is formed on a conductive layer may be, for example, a so-called mesh shape in which a plurality of linear conductive regions equidistantly disposed in parallel is formed substantially orthogonal to each other, a shape having a plurality of linear conductive regions equidistantly disposed in parallel, a shape in which a plurality of round through holes is formed on a conductive layer, and the like. Herein, the ground layer 55 is a mesh-shaped conductive pattern in which a plurality of linear conductive regions 55a and a plurality of linear conductive regions 55b, which are equidistantly disposed in parallel, are formed substantially orthogonal to each other and a plurality of through holes 55c is formed by the plurality of linear conductive regions 55a and the plurality of linear conductive regions 55b. It should be noted that even when the ground layer 55 shown in FIG. 4 is formed in a mesh shape, the electromagnetic wave shielding performance is almost unchanged as compared to the case in which it is formed in a solid shape.

In the present embodiment, as described above, in the wiring board 51 of the wiring member 50, the insulating base material 52, the wiring layer 53 disposed on the side of one surface 52a of the base material 52, and the ground layer 55 disposed in a position corresponding to at least the wiring layer 53, on the side of the other surface 52b of the base material 52 are stacked. In this manner, the electromagnetic waves emitted from the battery cells 20 are shielded by the ground layer 55, thereby suppressing the fluctuation (noise) of the potential of the detection lines 53a due to unwanted radiation. Thus, the deterioration of accuracy in detecting the voltage of the battery cell 20 corresponding to each detection line 53a can be suppressed.

Second Embodiment

Figure 5:
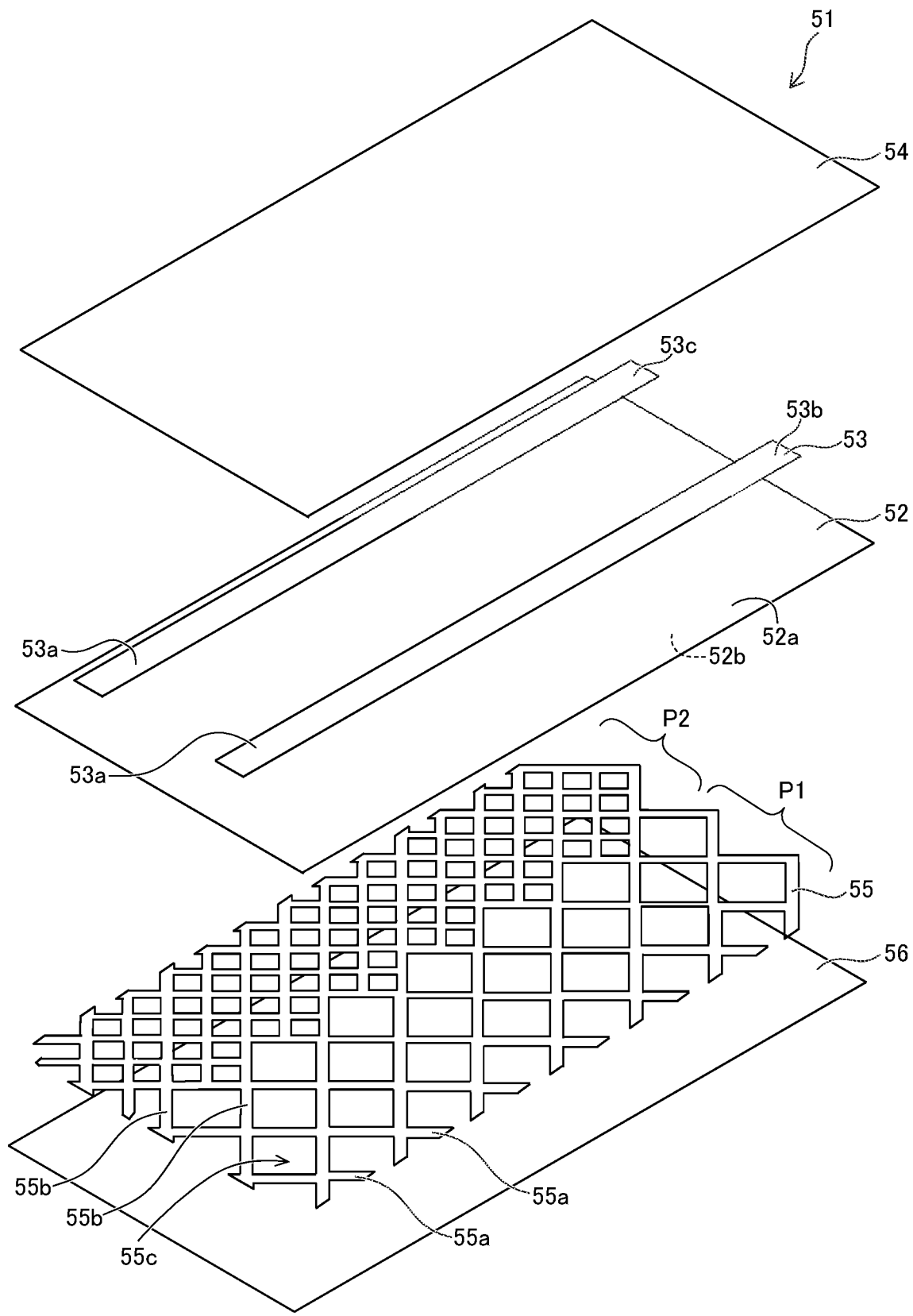
FIG. 5 is an exploded perspective view showing the peripheral structure of the wiring layer and the ground layer of the battery module according to a second embodiment of the present invention.

In the battery module 30 of a second embodiment of the present invention, as shown in FIG. 5, the detection lines 53a include detection lines 53b and 53c having different wiring lengths. The wiring length of the detection line 53b is longer than the wiring length of the detection line 53c.

Herein, when the detection lines 53b and 53c having different wiring lengths are provided, the impedances of the detection lines 53b and 53c differ. When the impedances of the detection lines 53b and 53c differ, the accuracy in detecting the voltage of each battery cell 20 by the aforementioned battery control device (not shown) is deteriorated, and thus, the impedances of the detection lines 53b and 53c are preferably the same.

Therefore, in the present embodiment, to equalize (or approximate) the impedances of the detection lines 53b and 53c having different lengths, the configuration is made so as to reduce the parasitic inductance generated in the detection line 53b. Specifically, the mesh-shaped conductive pattern of the ground layer 55 includes at least a first pattern portion P1 disposed so as to correspond to at least one detection line 53a (herein, detection line 53b) and a second pattern portion P2 disposed so as to correspond to at least one detection line 53a (herein, detection line 53c). The area ratio (the area of the conductive region/the area of the conductive region and through hole) of the second pattern portion P2 is larger than the area ratio of the first pattern portion P1.

That is, the area ratio of the first pattern portion P1 corresponding to the detection line 53b having a longer wiring length is set smaller than the area ratio of the second pattern portion P2 corresponding to the detection line 53c having a shorter wiring length. Thus, as compared to a case in which the second pattern portion P2 is disposed so as to face the detection line 53b, the area of the conductive region facing the detection line 53b can be reduced, so that the parasitic inductance generated in the detection line 53b can be reduced. Therefore, the impedances of the detection lines 53b and 53c can be equalized (or approximated), and thus, the aforementioned battery control device (not shown) can accurately detect the voltage of the battery cells 20.

It should be noted that FIG. 5 shows the example in which the ground layer 55 includes two conductive patterns of the first pattern portion P1 and the second pattern portion P2, but the same applies to the case including three or more pattern portions. Specifically, as in a modification of the second embodiment shown in FIG. 6, the detection lines 53a further include a detection line 53d that is shorter than the detection line 53b and longer than the detection line 53c. The conductive pattern of the ground layer 55 further includes a third pattern portion P3 disposed so as to face the detection line 53d. The area ratio of the third pattern portion P3 is larger than the area ratio of the first pattern portion P1 and smaller than the area ratio of the second pattern portion P2. In this manner, the area ratios of the facing pattern portions are changed in accordance with the wiring lengths of the detection lines 53a, so that the impedances of the plurality of detection lines 53a can be easily equalized (or approximated).

Figure 6:
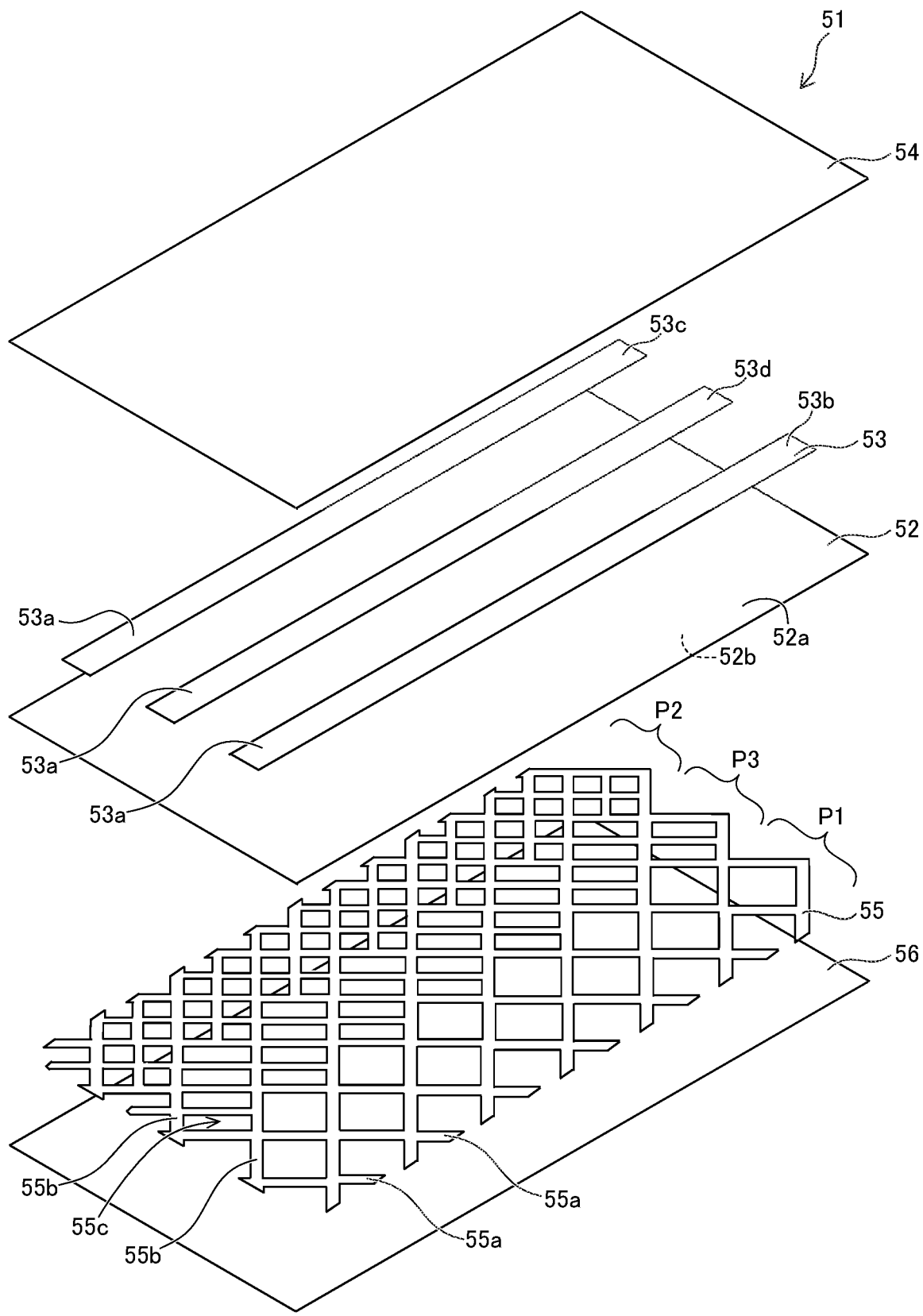
FIG. 6 is an exploded perspective view showing the peripheral structure of the wiring layer and the ground layer of the battery module of a modification of the second embodiment of the present invention.

Further, in FIG. 5 and FIG. 6, to differentiate the area ratios of the plurality of pattern portions of the ground layer 55, the pitches of the linear conductive regions 55a and 55b are changed, but the area ratios may be differentiated by, for example, partially widening or narrowing the line widths of the linear conductive regions 55a and 55b.

The other configurations and the advantageous effects of the second embodiment are the same as those of the aforementioned first embodiment.

Third Embodiment

Figure 7:
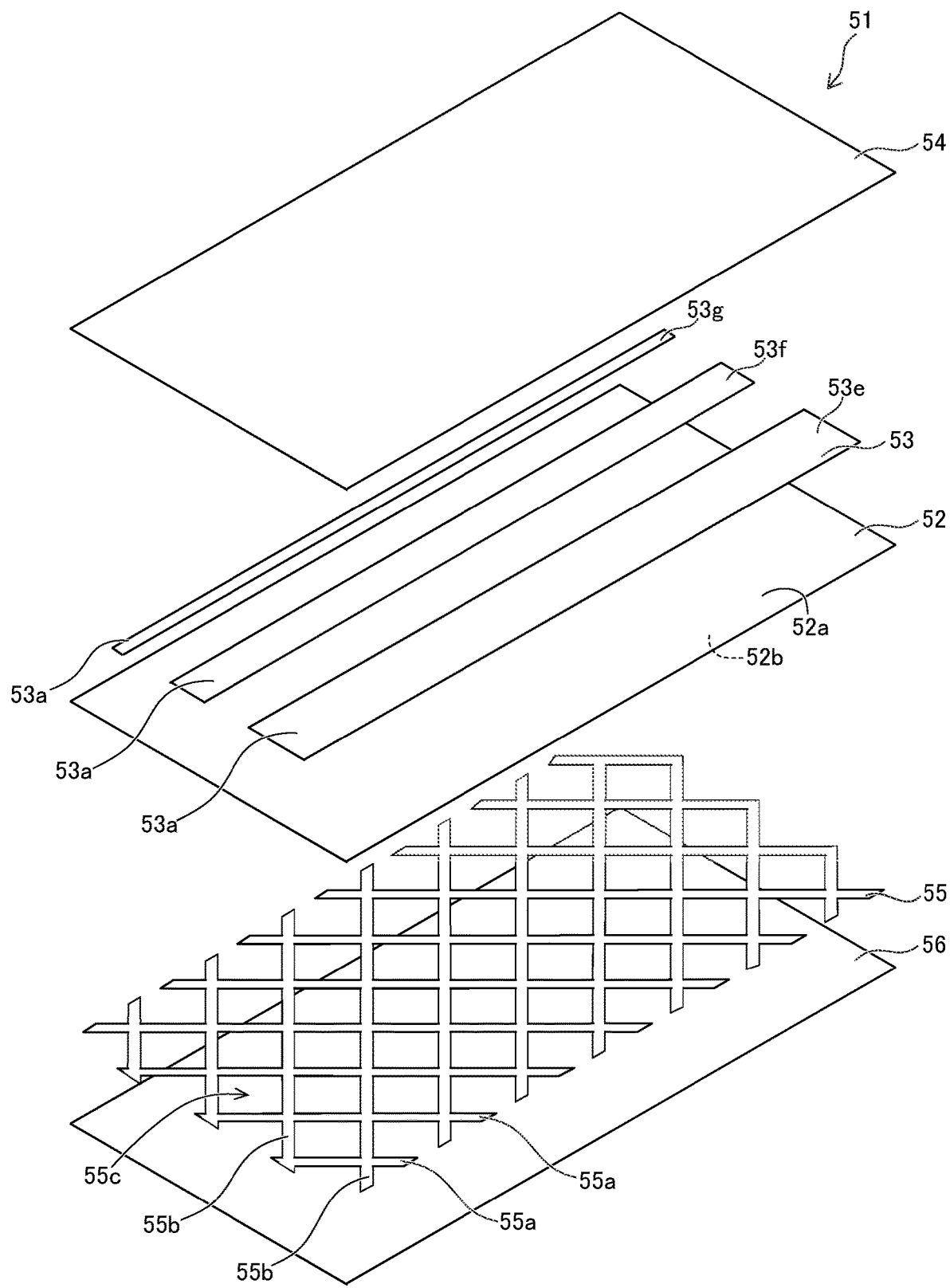
FIG. 7 is an exploded perspective view showing the peripheral structure of the wiring layer and the ground layer of the battery module according to a third embodiment of the present invention.

In the battery module 30 of a third embodiment of the present invention, as shown in FIG. 7, the detection lines 53a include detection lines 53e, 53f, and 53g having different wiring lengths. The wiring length of the detection line 53f is longer than the wiring length of the detection line 53g, and the wiring length of the detection line 53e is longer than the wiring length of the detection line 53f. For example, the detection line 53e is an example of the "second detection line" of the present invention, and the detection line 53g is an example of the "first detection line" of the present invention. It should be noted that in the present embodiment, the conductive pattern of the ground layer 55 is formed so as to have a substantially uniform area ratio.

Herein, in the present embodiment, to equalize (or approximate) the impedances of the detection lines 53e to 53g having different lengths, the wiring widths of the detection lines 53e to 53g are formed in the following manner. Specifically, the wiring width of the detection line 53f is formed wider than the wiring width of the detection line 53g, and the wiring width of the detection line 53e is formed wider than the wiring width of the detection line 53f. That is, as the wiring length of the detection line 53a increases, the wiring width of the detection line 53a is formed wider, so as to reduce the resistance per unit length. In this manner, the impedances of the detection lines 53a can be equalized (or approximated), so that the aforementioned battery control device (not shown) can accurately detect the voltage of the battery cells 20.

The other configurations and the advantageous effects of the third embodiment are the same as those of the aforementioned first embodiment.

It should be noted that the present invention is not limited to the aforementioned embodiments, and encompasses various modifications. For example, the aforementioned embodiments have been described in detail to facilitate the understanding of the present invention, and are not necessarily limited to those including all the described configurations. Further, the configuration of one embodiment can be partially replaced with the configuration of another embodiment or the configuration of one embodiment can be added to the configuration of another embodiment. In addition, for a part of the configuration of each embodiment, addition of other configurations, deletion, or replacement are possible.

For example, in the aforementioned embodiments, as the state of the battery cells 20, the example of detecting the voltage of the battery cells 20 has been shown, but the present invention is not limited thereto. The temperature of the battery cells 20 or the current flowing through the battery cells 20 may be detected. For example, when the temperature of the battery cells 20 is detected, a thermistor is attached to several battery cells 20 (for example, three of those) of the plurality of those and the wiring layer 53 of the wiring member 50 may be electrically connected to the thermistor. In this case also, the battery control device (not shown) can accurately detect the temperature of the plurality of battery cells 20.

Further, in the aforementioned embodiments, the example in which the ground layer 55 is disposed between the wiring layer 53 and the battery cells 20 has been shown, but the present invention is not limited thereto. The ground layer 55 may be disposed on the side opposite to the battery cells 20 across the wiring layer 53. That is, for example, the arrangement may be made such that the wiring layer 53 and the ground layer 55 are inverted in the vertical direction (thickness direction). In this case also, the fluctuation of the potential of the detection lines 53a due to unwanted radiation from the battery cells 20 can be suppressed, and thus, the deterioration of accuracy in detecting the voltage of each battery cell 20 can be suppressed.

Further, in the aforementioned embodiments, the example of the ground layer 55 formed in a mesh shape has been shown, but the present invention is not limited thereto. The ground layer 55 may be formed in a solid shape. In this case, for example, a conductive film in which an aluminum film, a silver film, or the like (ground layer) is provided with an adhesive layer on one side thereof may be attached to the wiring board 51 including the base material 52, the wiring layer 53, and the first cover layer 54. In this case, such a film may be attached to either the lower surface (the surface on the side of the battery cells 20) or the upper surface (the surface on the side opposite to the battery cells 20) of the wiring board 51. It should be noted that in the case of a configuration in which a conductive film is attached to the upper surface (the surface on the side opposite to the battery cells 20) of the wiring board 51 including the base material 52, the wiring layer 53, and the first cover layer 54, the adhesive layer of the conductive film and the first cover layer 54 correspond to the "insulating layer" of the present invention.

Moreover, the ground layer including an aluminum film, a silver film, or the like may be stacked and disposed on the lower surface or the upper surface of the wiring board 51 including the base material 52, the wiring layer 53, and the first cover layer 54.

In addition, the configurations obtained by appropriately combining the configurations of the aforementioned embodiments and the modification are also encompassed in the technical scope of the present invention. For example, the conductive pattern of the ground layer 55 of the aforementioned second embodiment may be combined with the detection lines 53a having different wiring widths of the aforementioned third embodiment for application. With such a configuration, the impedances of the plurality of detection lines 53a can be easily equalized (or further approximated).

REFERENCE SIGNS LIST

8A Positive electrode external terminal (terminal)
8B Negative electrode external terminal (terminal)
20 Battery cell
30 Battery module
50 Wiring member
52 Base material (insulating layer)
52a One surface
52b The other surface
53 Wiring layer
53a-53d, 53f Detection line
53e Second detection line (detection line)
53g First detection line (detection line)
55 Ground layer
55c Through hole
P1 First pattern portion
P2 Second pattern portion

The invention claimed is:

1. A battery module comprising:
a plurality of battery cells that are stacked and disposed; and
a wiring member disposed on a terminal side of the plurality of battery cells and adapted to detect a state of the plurality of battery cells,
wherein:
in the wiring member, an insulative insulating layer, a wiring layer disposed on one surface side of the insulating layer and including a plurality of detection lines to detect the state of the plurality of battery cells, and a ground layer disposed in a position corresponding to at least the wiring layer, on another surface side of the insulating layer and having a ground potential are stacked,
the ground layer is a conductive pattern in which a plurality of through holes is formed on a conductive layer and that has the ground potential,
the conductive pattern includes at least a first pattern portion disposed in a first area of the conductive pattern so as to correspond to at least one of the detection lines and a second pattern portion disposed in a second area of the conductive pattern different from the first area so as to correspond to at least another of the detection lines, and
the first pattern portion has a first area ratio of an area of the conductive layer in the first pattern portion to an entire area of the first pattern portion including the through holes, the second pattern portion has a second area ratio of an area of the conductive layer in the second pattern portion to an entire area of the second pattern portion including the through holes, and the second area ratio is larger than the first area ratio.

2. The battery module according to claim 1, wherein the plurality of detection lines has different wiring lengths, and
a wiring length of the detection line disposed so as to correspond to the first pattern portion is longer than a wiring length of the detection line disposed so as to correspond to the second pattern portion.

3. The battery module according to claim 1, wherein the plurality of detection lines comprises a first detection line and a second detection line having a longer wiring length and a wider wiring width as compared to the first detection line.

* * * * *